United States Patent [19]

Conterio

[11] 4,392,609

[45] Jul. 12, 1983

[54] PORTABLE PREHEATING SYSTEM FOR INTERNAL COMBUSTION ENGINES

[76] Inventor: Eugene E. Conterio, 445 Hillcrest Dr., Wilmette, Ill. 60091

[21] Appl. No.: 226,558

[22] Filed: Jan. 21, 1981

[51] Int. Cl.[3] .................................... B60H 1/02

[52] U.S. Cl. ........................ 237/12.3 C; 126/350 A; 432/219; 165/41

[58] Field of Search .................... 237/12.3 A, 12.3 B, 237/8 R, 12.3 C, 56; 126/350 A, 110 B; 122/13 R; 432/219; 165/41; 431/184

[56] References Cited

U.S. PATENT DOCUMENTS

| | | | |
|---|---|---|---|
| 2,210,049 | 8/1940 | Thompson | 126/350 A |
| 2,603,205 | 6/1952 | Schueden | 126/110 B |
| 2,716,400 | 8/1955 | Smith et al. | 237/8 R |
| 4,105,158 | 8/1978 | Hasebe et al. | 127/12.3 C |

*Primary Examiner*—Albert J. Makay
*Assistant Examiner*—Henry Bennett

[57] ABSTRACT

A portable liquid heater for preheating internal combustion engines with the heater consisting of a liquid reservoir, a heating chamber, and a circulating pump. The liquid of the reservoir may be preheated before introduction into the combustion engine system, or the like in the engine may be exhausted therefrom and heated by the apparatus and circulated back into the combustion engine system.

1 Claim, 3 Drawing Figures

PORTABLE PREHEATING SYSTEM FOR INTERNAL COMBUSTION ENGINES

SUMMARY OF THE INVENTION

In extremely cold climates it is found that internal combustion engines and diesel engines exposed to the cold present a problem in ignition. Many apparatuses have been developed to aid in the ignition of cold internal combustion engines and/or diesels. However, such devices have been inadequate to achieve the stated object by reason of improper circulating system, and inadequate liquid reservoir, as well as an impractical heating arrangement. It is an object of the present invention to overcome these objections of the prior art devices.

The present invention has as its principal object a portable apparatus that includes a liquid reservoir that may be preheated during the period of portability of the apparatus so as to make available an immediate source of heated liquid. The apparatus of the present invention will include a proper circulating system wherein the preheated liquid of the self-contained reservoir may be readily introduced into the circulating system of the internal combustion engine or the apparatus may provide a circulating system wherein the existing liquid in the internal combustion engine may be evacuated, heated and recirculated into the engine to aid in the initial combustion thereof.

The apparatus of this invention include a liquid reservoir, a heating chamber that readily accommodates an external independent heating device, and a circulating pump incorporated into a circulating system.

The apparatus of this invention is highly portable and economical in manufacture as well as highly efficient in use.

GENERAL DESCRIPTION OF THE DRAWINGS

The construction of the apparatus of this invention will be best understood by reference to the accompanying drawing which shows a preferred form of construction by which the stated objects of the invention are achieved, and in which.

GENERAL DESCRIPTION

Figure 1:
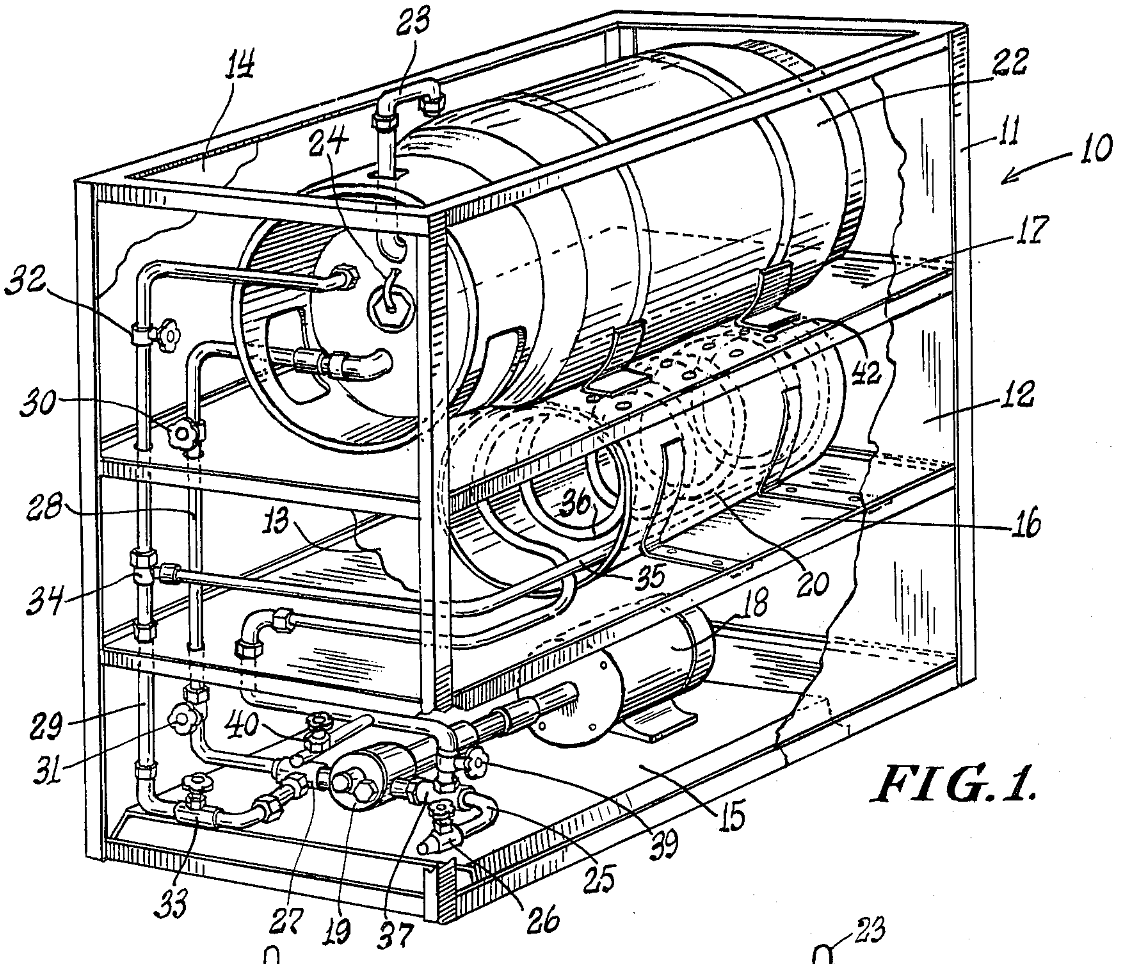
FIG. 1 is a perspective view of the apparatus of this invention with certain portions of the housing broken away.
Figure 2:
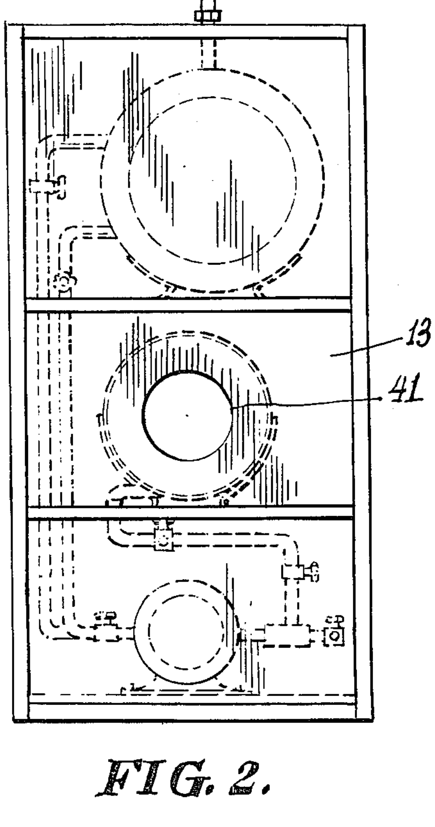
FIG. 2 is a front elevational view of the apparatus.

The portable preheater of this invention is indicated in FIG. 1 by reference numeral 10. It consists of a frame structure 11 to which is attached side walls 12, end walls 13, and a top wall 14, all shown fragmentarily in FIG. 1.

The frame 11 may be equipped with independent wheels or it may be mounted upon a trailer or truck bed in any manner which will afford portability to the apparatus.

The frame 11 supports a bottom wall 15 as well as internal shelves 16 and 17. Thus, the interior of the housing is compartmentallized as hereinafter made apparent.

Mounted in the lowermost compartment on the bottom wall 15 is a suitable variable speed electric motor 18 which in turn operates a circulating pump 19.

Figure 3:
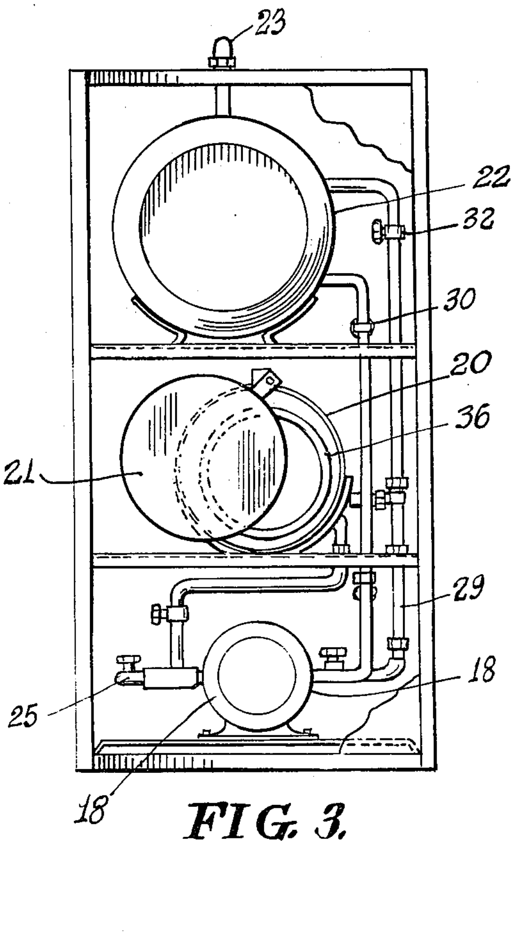
FIG. 3 is a rear elevational view of the apparatus.

Within the middle compartment and mounted on the shelf 16 is a heating chamber 20. As shown in FIG. 3, it is noted that the rear of the heating chamber 20 is provided with a damper 21 which is movable about a horizontal axis into and out of a closing position for the heating chamber 20. Through the use of the damper 21 the amount of heat within the chamber 20 may be regulated.

Mounted on the top shelf 17 is a liquid reservoir 22. The reservoir 22 is in the form of a tank and it includes a vent 23 as well as a suitable conduit 24 that may be connected to a temperature gauge as well as a capacity gauge, not shown.

The device includes circulating means as well as control means for conditioning the apparatus for liquid circulation between the reservoir 22, the heating chamber 20, as well as the vehicle being serviced.

The pump 19 is connected by a pipe 25 to an out flow valve 26 which includes a quick connector (not shown) of any well-known construction such as is presently available in the commercial market. The other side of the pump 19 is connected to a T-connector 27, which, in turn, by a line connection 28, is connected to the reservoir 22. The stem of the T-connector 27 by a line connection 29 is connected to the reservoir 22. In the line connection 28 there are a pair of shut-off valves 30 and 31 while in line connection 29 there are a pair of like shut-off valves 32 and 33.

By a suitable T-connector 34 the line connector 29 is connected to the output line 35 of the heating coils 36 which are located within the heater 20.

By a suitable T-connector 37 one side of the pump 19 is connected to the input line 38 for the heating coils 36 of the circulating system. Also in line 38 there is a control valve 39, an intake flow valve 40. When it is desired to heat the liquid within the reservoir 22, the valve 33 is closed while valves 30, 31, 32 and 39 are open permitting the pump 19 to circulate liquid from the reservoir through lines 28 and 38 into coils 36 and through lines 35 and 29 back to the reservoir 22. When the system is so controlled, the liquid in the reservoir 22 may be preheated. In the event that liquid is to be taken into the system for preheating the flow valves 26 and 40 are open in addition to all those previously identified.

When it is desired to heat an external supply of liquid, valves 30, 31 and 32 are closed while flow valves 26, 33, 39 and 40 are open. This permits the external fluid to enter through flow valve 40, pass through line 38, through coils 36, lines 35 and 29 and through the pump lines 25, and out the valve 26.

The source of heat required to heat the coils 36 may be obtained from a propane torch or other fuel-fired device or even an electrical heat exchanger. The torch or heating element is projected through the opening 41 formed in the end wall 13 so as to be positioned within the heating chamber 20.

It should be noted that the shelf 17 supporting the reservoir 26 which separates the heating chamber from the reservoir is provided with a series of perforations 42 by which excess heat may circulate into the upper compartment and around the reservoir 22 to aid in the heating or maintaining the same in a heated condition.

It should also be noted that the damper 21 may be pivoted so as to regulate the degree of heat contained within the heating chamber. Again permitting excess heat therefrom to pass upwardly to the top compartment through the perforations 42.

It should also be noted that all of the valves while shown as being manual can be of the electrical type which are readily available on the market without departing from the inventive concept of this preheating system and apparatus.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described the invention what I claim as new and desire to protect by Letters Patent is:

1. A portable preheating apparatus for internal combustion engines comprising:

(a) a portable cabinet-like housing internally compartmentallized by a plurality of horizontally disposed parallel shelves, (b) a liquid reservoir in one of said compartments, (c) a heating chamber housing heating coils for heating liquid in said reservoir as well as liquid in the engine to be preheated, in another of said compartments, (d) a pump common to said reservoir and said heating coils in yet another of said compartments, (e) said pump having an inlet and an outlet each in communication with said liquid reservoir and said heating coils as well as the engine to be preheated, (f) a series of pipe conduits within said housing connecting said inlet and said outlet of said pump to said heating coils, said liquid reservoir, and the engine to be preheated, (g) a series of valves interposed in said pipe conduits connecting said inlet and said outlet of said pump to said heating coils completing a course for recycling of the fluid by said reservoir between said liquid reservoir and said heating coils, (h) a second series of valves interposed in said pipe conduits connecting said inlet and said outlet of said pump to said heating coils and said liquid reservoir and the engine to be heated completing a course of circulation of the liquid by said pump between said heating coils and said reservoir and the engine to be heated, and (i) a third series of valves interposed in said pipe conduits connecting said inlet and said outlet of said pump to said heating coils and the engine to be heated completing a course of recycling of the liquid by said pump between said heating coils and the engine to be heated.

* * * * *